(12) United States Patent  (10) Patent No.: US 8,282,061 B2
Jimenez et al.  (45) Date of Patent: Oct. 9, 2012

(54) MOUNTING CLIPS AND SENSOR INSTALLATIONS FOR MOTORIZED VEHICLE DOORS

(75) Inventors: Jorge Jimenez, Downers Grove, IL (US); Nick Scholtes, Shorewood, IL (US); Robert C. Signaigo, Lemont, IL (US)

(73) Assignee: Control Solutions LLC, Aurora, IL (US)

( * ) Notice: Subject to any disclaimer, the term of this patent is extended or adjusted under 35 U.S.C. 154(b) by 19 days.

(21) Appl. No.: 13/049,627

(22) Filed: Mar. 16, 2011

(65) Prior Publication Data

US 2011/0163209 A1 Jul. 7, 2011

Related U.S. Application Data

(62) Division of application No. 12/197,058, filed on Aug. 22, 2008, now Pat. No. 7,938,376.

(51) Int. Cl.
*A47G 1/10* (2006.01)
(52) U.S. Cl. ............................... 248/316.7; 248/229.16
(58) Field of Classification Search ............... 248/316.7, 248/309.1, 316.1, 229.16, 229.26, 228.7, 248/230.7, 231.81
See application file for complete search history.

(56) References Cited

U.S. PATENT DOCUMENTS

| | | | |
|---|---|---|---|
| 5,295,334 A | 3/1994 | Haraden | |
| 5,459,962 A | 10/1995 | Bonne et al. | |
| 5,489,708 A | 2/1996 | Bailey et al. | |
| 5,619,774 A | 4/1997 | Perry | |
| 5,793,005 A | 8/1998 | Kato | |
| 5,880,421 A | 3/1999 | Tsuge et al. | |
| 6,073,899 A | 6/2000 | Omrani | |
| 6,081,088 A | 6/2000 | Ishihara et al. | |
| 6,233,872 B1 | 5/2001 | Glagow et al. | |
| 6,337,549 B1 | 1/2002 | Bledin | |
| 6,339,305 B1 | 1/2002 | Ishihara et al. | |
| 6,389,752 B1 | 5/2002 | Rosenau | |
| 6,483,054 B2 | 11/2002 | Suzuki et al. | |
| 6,484,365 B1 | 11/2002 | Thompson | |
| 6,547,201 B2 | 4/2003 | Barich et al. | |
| 6,747,399 B1 | 6/2004 | Ogino et al. | |
| 7,015,666 B2 | 3/2006 | Staus | |
| 7,513,166 B2 | 4/2009 | Shank et al. | |
| 7,518,327 B2 | 4/2009 | Newman et al. | |
| 7,712,256 B2 | 5/2010 | Kato et al. | |
| 7,753,419 B2 | 7/2010 | Kondo | |
| D626,438 S | 11/2010 | Prichard et al. | |
| 2002/0088662 A1 | 7/2002 | Kleinberg | |
| 2003/0085679 A1 | 5/2003 | Bledin et al. | |
| 2003/0230690 A1 | 12/2003 | Ostrovsky et al. | |
| 2004/0094682 A1 | 5/2004 | Waterman | |
| 2005/0012484 A1 | 1/2005 | Gifford et al. | |
| 2005/0179415 A1 | 8/2005 | Nakano et al. | |
| 2006/0087418 A1 | 4/2006 | Takeuchi | |
| 2008/0303685 A1 | 12/2008 | Nakano et al. | |

FOREIGN PATENT DOCUMENTS

JP 2004-116027 4/2004

*Primary Examiner* — Ramon Ramirez
(74) *Attorney, Agent, or Firm* — The Eclipse Group LLP

(57) ABSTRACT

Clips for attaching sensors, cables, or other items to doors, such as retrofitted armored vehicle doors, are provided. In one example embodiment, a clip includes a strip portion, a first attachment arm extending from the strip portion, and a second attachment arm extending from the strip portion. A barb leg is disposed at an angle relative to the strip portion and includes a first leg end and a second leg end opposite the first leg end. The barb leg is connected at the first leg end to the second attachment arm, and the second leg end is disposed towards and spaced apart from the strip portion. A cable clamp extends from an end of the second attachment arm opposite the strip portion or an end of the strip portion opposite the first attachment arm.

6 Claims, 8 Drawing Sheets

MOUNTING CLIPS AND SENSOR INSTALLATIONS FOR MOTORIZED VEHICLE DOORS

CROSS-REFERENCE TO RELATED APPLICATION

This application is a divisional of U.S. patent application Ser. No. 12/197,058, filed Aug. 22, 2008 and titled MOUNTING CLIPS AND SENSOR INSTALLATIONS FOR MOTORIZED VEHICLE DOORS, which is incorporated by reference in this application in its entirety.

FIELD OF THE INVENTION

This invention relates to sensors and sensor installation devices. More particularly, the invention is related to a sensor and a clip that is used to install the sensor, such as around a perimeter of a motorized door to detect obstructions between a closing door and a door frame.

BACKGROUND

To further protect military personnel during combat, military vehicles can be provided with layers of armor. In some vehicles, the armor may be provided on the vehicle in the factory during manufacture of the vehicle. However, it has become increasingly common for armor to be applied to existing vehicles in the field.

The military started adding armor to various vehicles such as, for example, its High Mobility Multipurpose Wheeled Vehicle, or "HMMWV" or "Humvee," well before Operation Iraqi Freedom, but attacks from small arms, rocket-propelled grenades and "improvised explosive devices," or IEDs in military parlance, prompted the military to increase protection for vehicles already in the field. The "up-armored" HMMWV can weigh thousands of pounds more than the standard HMMWV and includes several hundred pound steel-plated doors. Such heavy armored doors make opening and closing the doors increasingly difficult for personnel.

In co-pending and commonly assigned U.S. patent application Ser. Nos. 12/194,895 and 12/194,966, there is provided a mechanism for assisting in moving heavy armored doors on military vehicles. Such a mechanism can be retrofitted to existing vehicles that are up-armored in the field. To promote safety with such motorized door assist systems, sensors can be desirably applied to ensure the door stops when an object or body part is in the way of door closing. There is a need for such a sensor system that can be applied to vehicle doors, and retrofitted to vehicles that are up-armored in the field.

In particular, as many military vehicles were not designed in order to have sensor parts attached thereto, there is a need for a sensor system that can be retrofitted to parts of vehicle doors that have manufacturing variability, e.g., slightly misaligned parts from one door to the next in the same type of vehicle. Misalignments in welded door parts, albeit small and inconsequential to the structure and strength of the door, can present problems for parts designed to be attached to these welded parts as the variations can cause fit problems.

SUMMARY

Clips for attaching sensors, cables, or other items to doors, such as retrofitted armored vehicle doors, are provided.

In one example embodiment, a clip includes a strip portion, a first attachment arm extending from the strip portion, and a second attachment arm extending from the strip portion. A barb leg is disposed at an angle relative to the strip portion and includes a first leg end and a second leg end opposite the first leg end. The barb leg is connected at the first leg end to the second attachment arm, and the second leg end is disposed towards and spaced apart from the strip portion. A cable clamp extends from an end of the second attachment arm opposite the strip portion or an end of the strip portion opposite the first attachment arm.

In another example embodiment a clip includes a strip portion and a first attachment arm and a second attachment arm each extending from the strip portion. The strip portion is planar, and the first attachment arm extends at a first end of the strip portion substantially perpendicular to the strip portion. The second attachment arm comprises a curved portion that extends from the first end of the strip portion. A barb leg is disposed at an angle relative to the strip portion and includes a first leg end and a second leg end. The barb leg is connected at the first leg end to the second attachment arm. The second leg end is disposed towards and spaced apart from the strip portion.

In another embodiment, a clip comprises a planar strip portion having a first end and a second end opposite the first end. A countersunk mounting aperture is disposed through the strip portion for receiving a fastener therethrough. The clip also includes two first attachment arms that extend substantially perpendicular from a first end of the strip portion. A second attachment arm extends from the strip portion and includes a curved portion that extends from the first end of the strip portion. The curved portion of the second attachment arm is disposed between the two first attachment arms. A barb leg is disposed at an angle relative to the strip portion and includes a first leg end and a second leg end. The barb leg is connected to the second attachment arm at the first leg end. The second leg end of the barb leg is disposed towards and spaced apart from an area toward the second end of the strip portion.

In an additional embodiment, a clip includes a planar strip portion having a first end and a second end opposite the first end. A first attachment arm extends from the first end of the strip portion. At least two barb legs are disposed at an angle relative to the strip portion. Each of the barb legs includes a first leg end and a second leg end. Additionally, each of the barb legs is connected at the first end to the second attachment arm. The second leg end is disposed toward and spaced apart from an area toward the second end of the strip portion. A curved cable clamp extends from an end of the second attachment arm opposite the strip portion or from an end of the strip portion opposite the first attachment arm.

DETAILED DESCRIPTION

Figure 1:
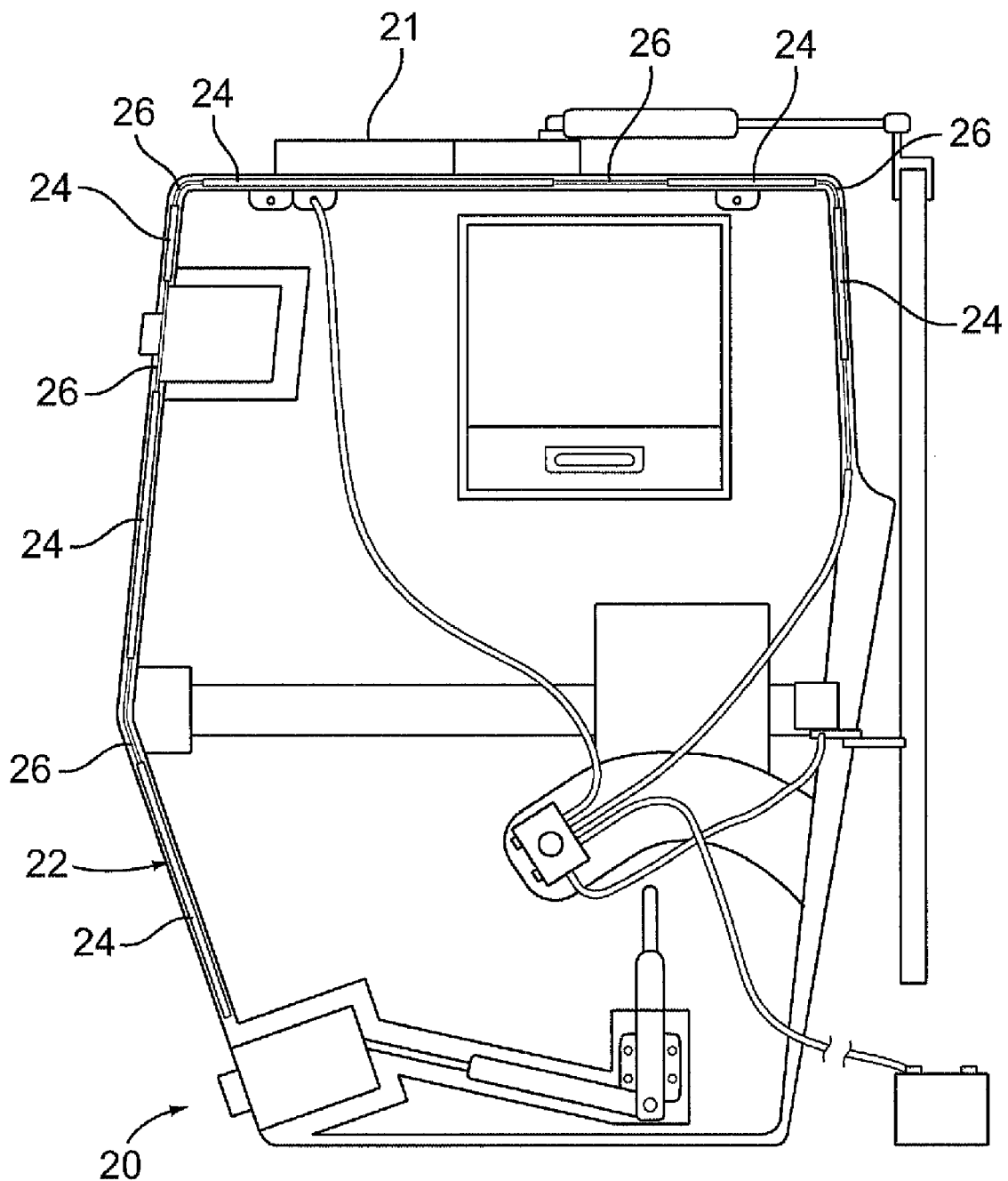
FIG. 1 illustrates an exemplary vehicle door including a motorized door assist system.

A clip for securing one object relative to another, such as securing an object to a vehicle door or frame is provided. In one embodiment, the clip is used to retrofit a vehicle door with a strip of safety sensors, and, more particularly, may retrofit vehicle doors that are not originally intended to be retrofitted in this way. Co-pending patent application Ser. Nos. 12/194,895 and 12/194,966 provide an apparatus for assisting in moving heavy armored doors on military vehicles. Such an apparatus can be retrofitted to existing vehicles that are up-armored in the field. To promote safety with such motorized door assist systems, sensors can be applied to ensure the door stops when an object or body part is in the way of door closing. FIG. 1 is an example armored vehicle door as described in the co-pending patent application Ser. Nos. 12/194,895 and 12/194,966, entitled "Door Assist System and Method For Retrofit Installation of Apparatus" and "Door Assist System Controller and Method" respectively, herein incorporated by reference.

The door 20 of FIG. 1 includes a safety sensor, referred to herein as safety switch 22. The safety switch 22 activates should the automated door 20 be closing and any part of the switch 22 is depressed. When depressed the switch 22 will cause the moving door 20 to immediately cease and, optionally, open a small amount. This safety mechanism is intended to prevent door closures while obstructions remain between the door and the door frame. The safety switch 22, which is connected to a control box 21, can include one or more sensors 24 strategically placed around at least portions of the outside perimeter of the door. In one embodiment, the safety switch 22 includes a multi-segmented, large surface area, single pole switch, as generally illustrated in FIGS. 2 and 3, that is located around at least portions of the inside perimeter of the door.

Figure 2:
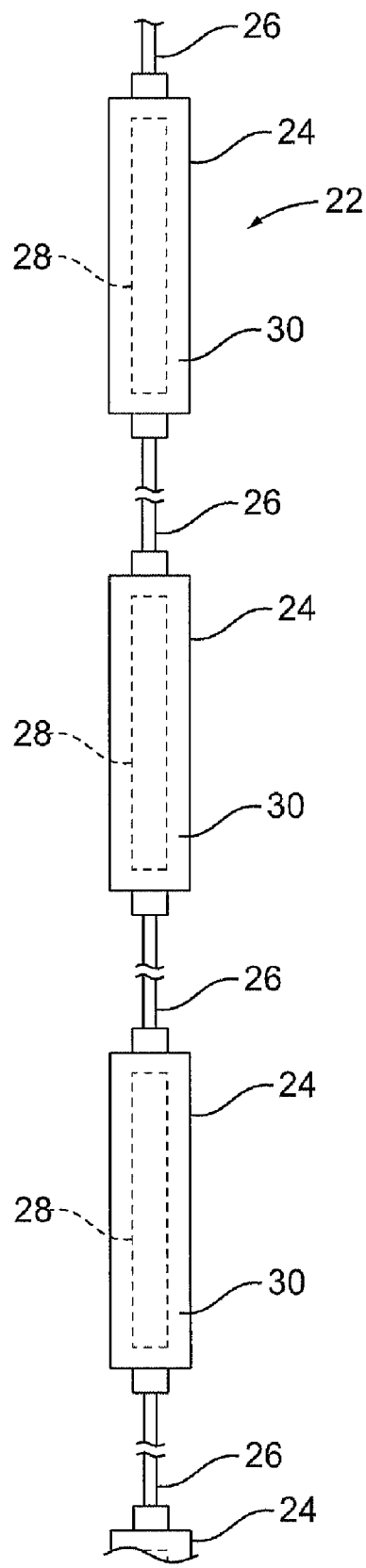
FIGS. 2 and 3 illustrate a safety switch according to one example embodiment.

The safety switch 22 of FIG. 2 includes a plurality of sensors 24 connected by electrical connectors, e.g., wires or cables 26. Each sensor 24 includes a touch-sensitive sensing element 28 (e.g., a stainless steel electrode) molded in a semi-circular polymer casing 30. The cables 26 can also be enclosed by the polymer casing 30, which can be formed of various deformable polymer materials, such as rubber or polyurethane. The length and spacing of the individual sensors 24, and thus the length of the intermediate cables 26, are dependent on the need of the installation. In one example, the safety switch may be a modified version of the SENSI-SWITCH available from Recora (Batavia, Ill.), but the safety switch is not intended to be limited to any particular size, shape, sensor type, or materials of formation.

Figure 3:
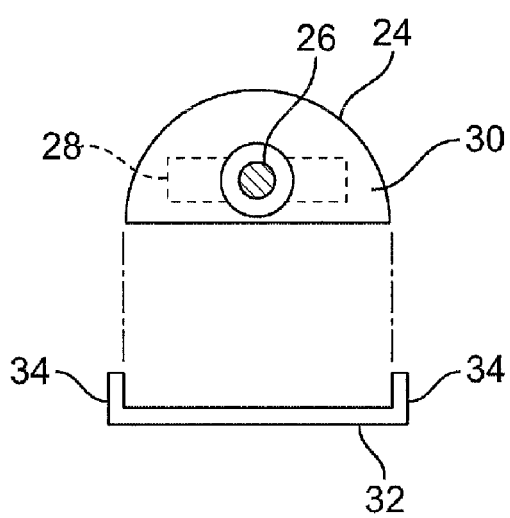

In one embodiment, as shown in FIG. 3, the semi-circular sensor 24 can be secured to a surface by a mounting bracket 32. The mounting bracket 32 can be a metal or plastic mounting bracket that is in turn attached to the vehicle door, such as using the clips discussed below. The sensor 24 can be held in the mounting bracket 32 by any suitable means, such as an adhesive, double sided adhesive tape, or by being secured by angled bracket arms 34. The sensor 24 can, for example, clip into or slide in from an end of the bracket 32, and be held by the angled bracket arms 34. The sensors 24, for example, may include molded-in threaded nuts or other fasteners for use in attaching to the clip or bracket.

Figure 9:
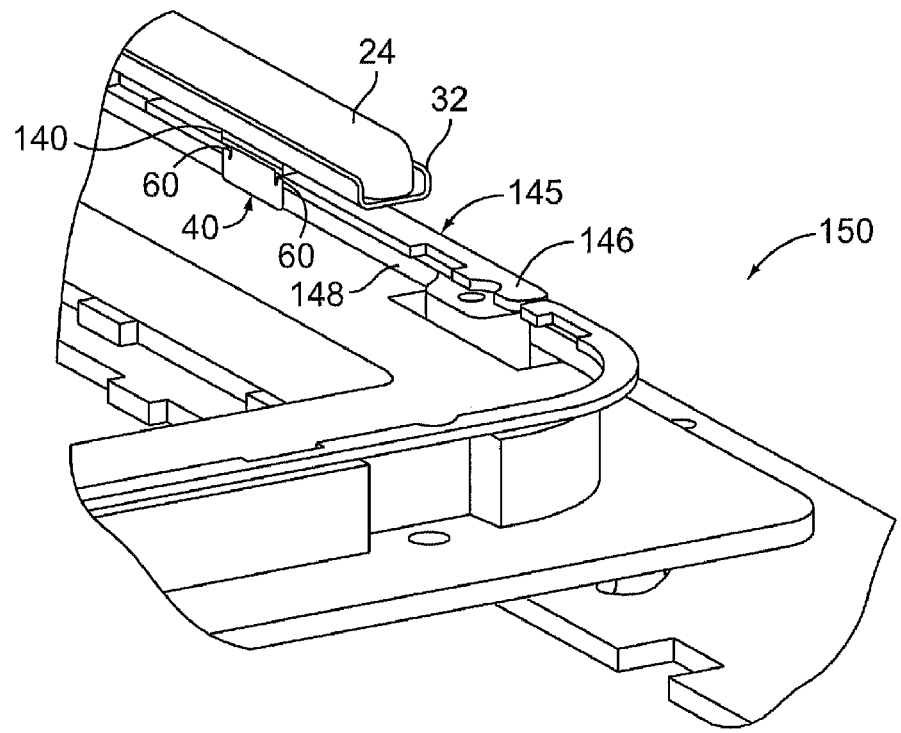
FIGS. 9-11 illustrate one example of a sensor switch applied to a vehicle door by clips.
Figure 10:
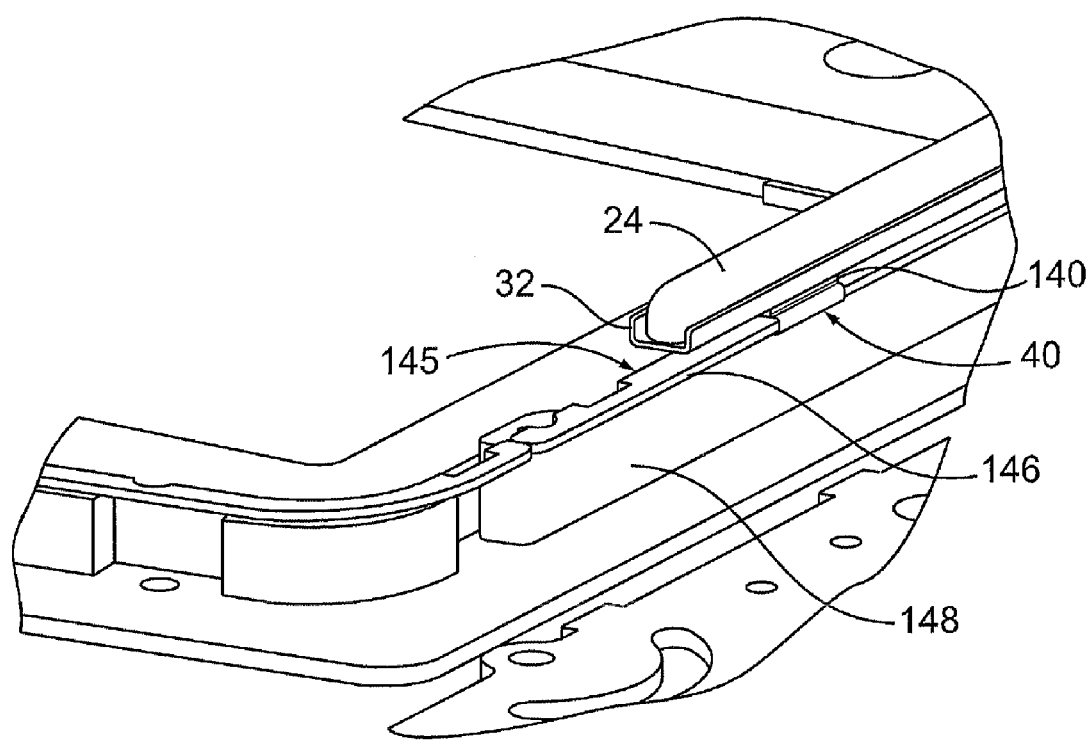
Figure 11:
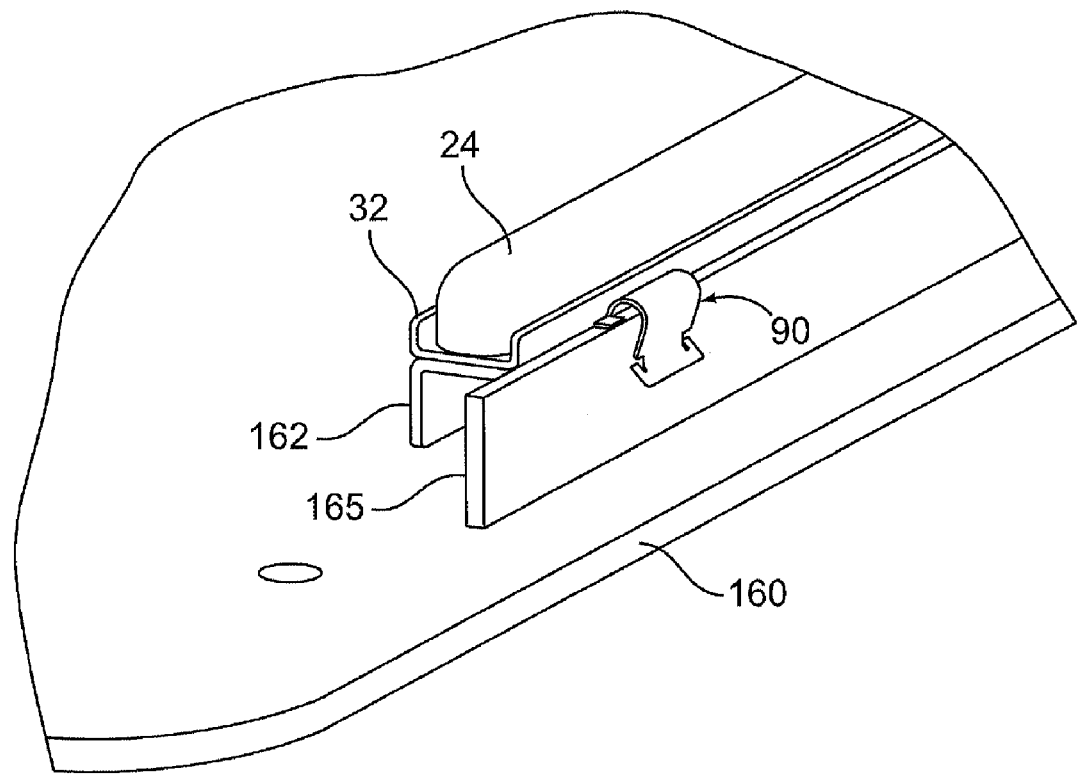

As discussed above, the Humvee vehicle doors are commonly retrofitted with heavy armor in the field. Thus the motorized door system and safety sensors discussed above are also desirably retrofitted to existing doors. As it is generally undesirable to drill into the armored doors, the present invention provides clips for attaching the safety strips to the vehicle doors. FIGS. 4A-C through 7A-C illustrate particular embodiments of clips useful to apply the safety strip. The clips may be designed to attach to "L" or "T"-shaped flanges of any vehicle, thereby allowing the sensor system to be retrofitted to any type of vehicle door without the need for drilling or a special tool. FIGS. 9-11 illustrate embodiments of the clips attaching a safety switch sensor to a vehicle door.

Figure 4A:
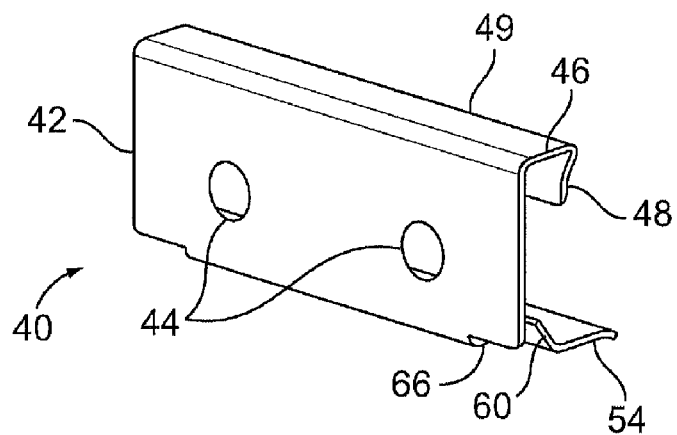
FIGS. 4A-C illustrate a clip according to one example embodiment.
Figure 4B:
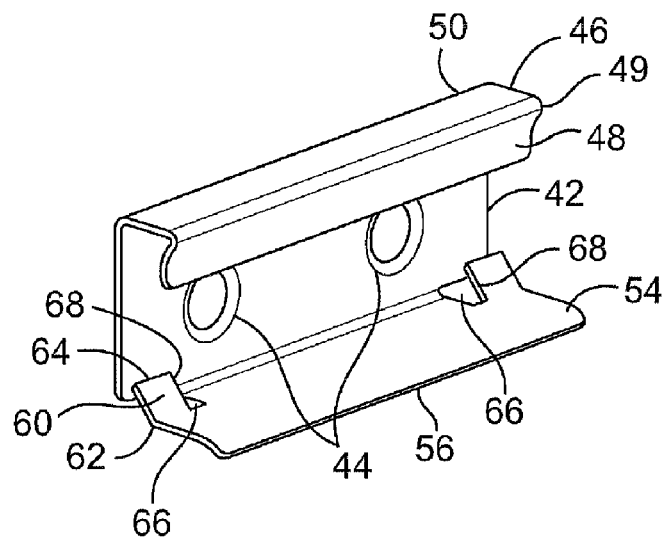
Figure 4C:
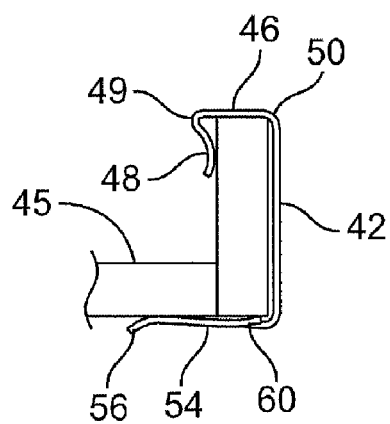

FIGS. 4A-C illustrate a clip 40 according to one embodiment. The clip 40 included a strip portion 42 to which the safety switch or a mounting bracket can be attached. As shown in FIGS. 4A-B, the strip portion 42 can include one or more countersunk mounting apertures 44. Fasteners can extend through the mounting apertures 44 for connecting a mounting bracket to the strip portion 42.

A first attachment arm 46 extends at an angle, more particularly substantially perpendicular, from the generally planar strip portion 42. In the example shown in FIGS. 4A-C, an attachment tab 48 extends at an angle from an end 49 of the first attachment arm 46 that is opposite a second end 50 of the first attachment arm 46 that is connected to the strip portion 42. As shown in FIG. 4C, the first attachment arm 46 and the attachment tab 48 secure over one end of an "L"-shaped portion, e.g., flange 45, of a vehicle door. The attachment tab 48 is desirably curved to facilitate attachment to the flange 45. The properties of the clip material and the dimensioning of the first attachment arm 46 and tab 48 allow for a gripping force on the thickness of the flange 45, and the curved tab 48 allows the clip 40 to be easily installed over the top of the flange.

A second attachment arm 54 extends at an angle, more particularly substantially perpendicular in FIGS. 4A-C, from an opposite end of the strip portion 42 from the first attachment arm 46. Thus, the second attachment arm 54 is substantially parallel to the first attachment arm 46. As shown in FIG. 4C, the second attachment arm 54 secures around an opposite end of the flange 45 from the first attachment arm 46. The second attachment arm 54 can optionally include an angled end portion 56 for facilitating attachment to the flange 45.

The clip 40 includes two barb legs 60 disposed at an angle relative the strip portion 42. The barb legs 60 each include a first leg end 62 and a second leg end 64 opposite the first leg end 62. Each of the barb legs 60 is connected at the first leg end 62 to the second attachment arm 54, and the second leg end 64 is disposed toward and spaced apart from the strip portion 42. The second leg end 64 is desirably bent toward the direction of the first attachment arm 46 and the flange 45, and, as shown in FIG. 4C, assists in securely holding the clip 40 on the flange 45. The clip 40 optionally includes a recess space 66 disposed adjacent to a side end 68 of each of the barb legs 60. The recess spaces 66, which separate the barb leg side ends 68 from the second attachment arm 54, can be used for facilitating removal of the clip 40 with a tool such as a screwdriver. Furthermore, the placement of the barb legs 60 toward the outer side edges of the clip 40 also facilitates removal of the clip 40.

As shown in FIG. 4C, the flange 45 is formed of a horizontal portion and a vertical portion. In the example of the clip 40 shown, the barb legs 60 are designed to contact the bottom surface of the vertical portion of the flange. This can be particularly beneficial when the flange 45 is formed from the vertical portion being welded to the horizontal portion. It is common that the welded connection of the horizontal and vertical portions is not flush. By having the barb legs 60 contact the vertical portion, the clip 40 is assured a secured fit even when the flange components are misaligned. Also, the vertical portion of the flange 45 is often composed of several sections around the door horizontal flange, and having multiple clips attached to a single bracket which may span more than one vertical portion, any misalignment in the vertical portions can be better accommodated. In this manner, the clips and safety sensor may allow for retrofitting vehicle doors that were not intended to be retrofitted in this way.

As will be appreciated by those skilled in the art following the teachings herein provided, various sizes, shapes, and configurations are available for the clip depending on need, such as depending on the configuration of the vehicle door. Further, various and alternative materials can be used to form the clip. In one example, the clips may be formed at least in part from spring steel.

Figure 5A:
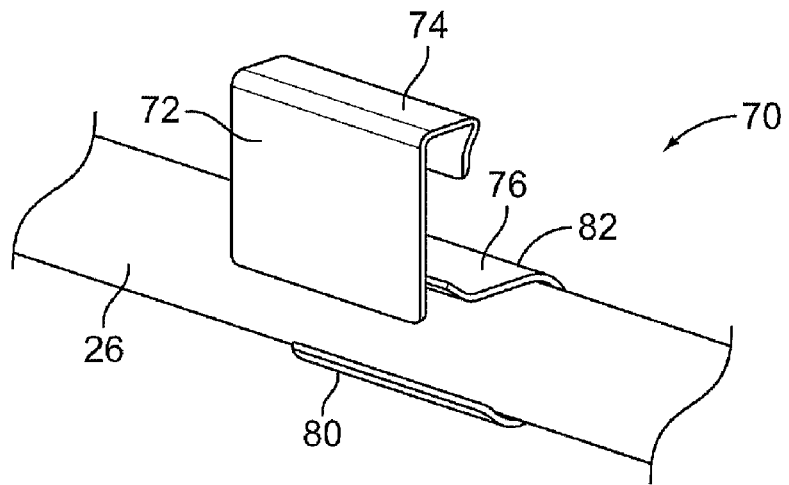
FIGS. 5A-C illustrate a clip according to another example embodiment.
Figure 5B:
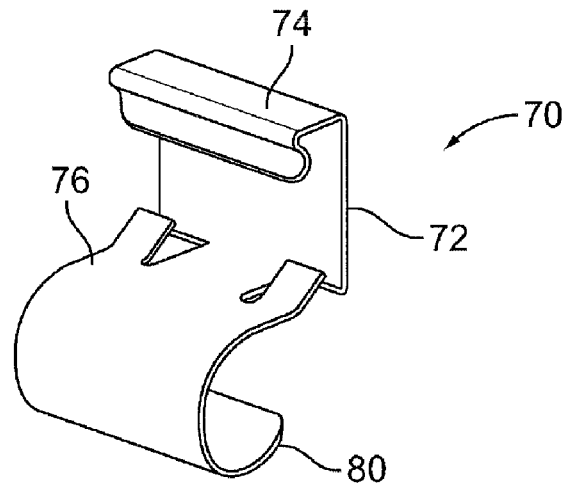
Figure 5C:
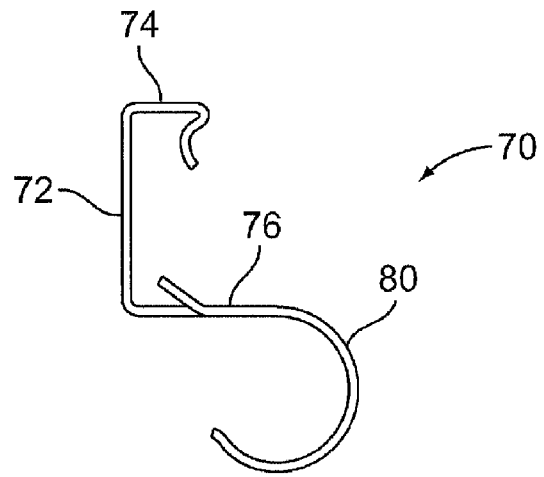

FIGS. 5A-C illustrate a clip 70 according to another embodiment, which is a variation of the clip in FIGS. 4A-C. Clip 70 includes a strip portion 72, a first attachment arm 74 and a second attachment arm 76 as discussed above, and which function as discussed above. Clip 70 differs from clip 40 discussed above, by including a curved cable clamp 80 extending from an end 82 of a second attachment arm 76 that is opposite the strip portion 72. The cable clamp 80 is particularly useful for holding electrical connectors (i.e., electrical connection devices or electrical conductors), such as a cable 26 of the safety switch 22 shown in FIG. 2.

The clip 70 can be used in combination with the clip 40 to secure, for example, the safety switch 22 to a vehicle door such as shown in FIG. 1. The clip 40 can be used to secure the sensor 24 portion of the safety switch 22, and the clip 70 can be used to secure the cable 26. In the example shown in FIGS. 5A-C, the clip 70 does not include any optional countersunk mounting aperture, as this clip 70 is designed for securing the cable 26. However, clip 70 can include one or more countersunk apertures if a single, dual-purpose clip is desired.

Figure 6A:
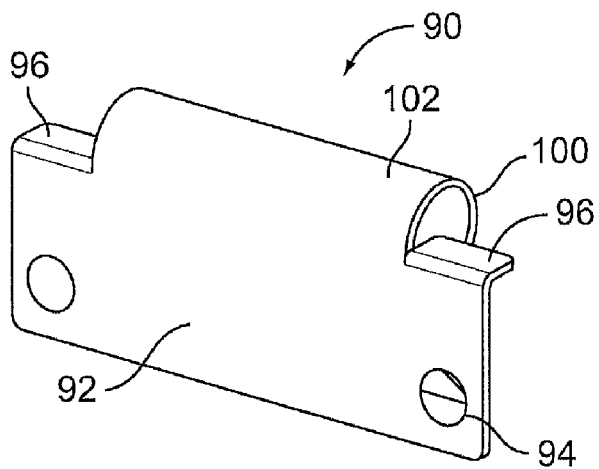
FIGS. 6A-C illustrate a clip according to another example embodiment.
Figure 6B:
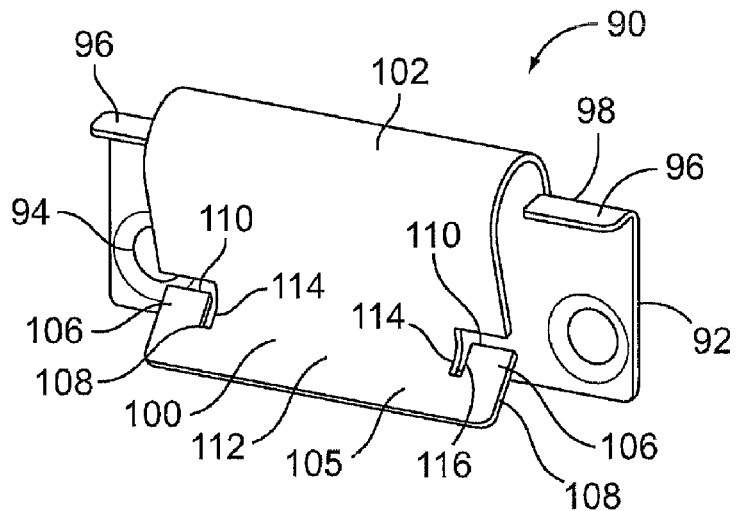
Figure 6C:
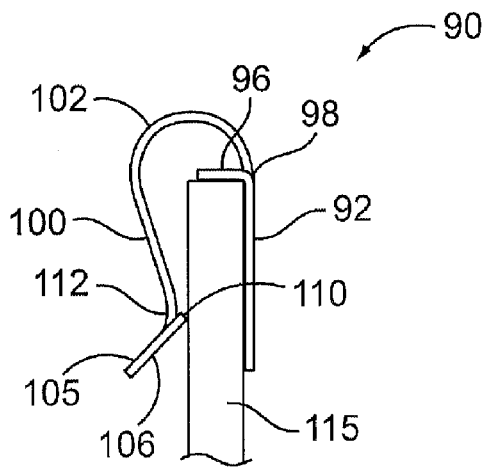

FIGS. 6A-C illustrate a clip 90 according to yet another example embodiment. Whereas the clips 40 and 70 discussed above are designed for a bent or "L"-shaped flange, such as shown in FIG. 4C, the clip 90 is designed for a straight or "I"-shaped door lip or flange, such as shown in FIG. 6C.

Clip 90 includes a substantially planar strip portion 92 including a countersunk mounting aperture 94 for receiving a fastener therethrough. The clip 90 includes two first attachment arms 96 extending at an angle (e.g., substantially perpendicular) from the strip portion 92 at a first end 98 of the strip portion 92. A second attachment arm 100 also extends from the first end 98 of the strip portion 92. The second attachment arm 100 includes a curved portion 102 extending from the first end 98 of the strip portion 92. The curved portion 102 is disposed between the two first attachment arms 96. The two first attachment arms 96 provide for proper alignment of the sensor or cable around the flange 115 as they limits the depth to which the flange 115 penetrates into the clip 90. Incorrect placement of the clip 90 on the flange can result in the safety switches being rendered inoperable due to incorrect placement and/or the cable being disposed in a pinch point of the door perimeter.

The clip 90 includes two barb legs 106 disposed at an end 105 of the second attachment arm 100 that is opposite the strip portion 92. Each of the barb legs 106 is disposed at an angle relative the strip portion 92. Each of the barb legs includes a first leg end 108 and a second leg end 110 that is opposite the first leg end 108. Each barb leg 106 is connected at the first leg end 108 to the second attachment arm 100 and the second leg end 110 is disposed or pointed toward and spaced apart from the strip portion 92. In the embodiment shown in FIGS. 6A-C, the second attachment arm 100 includes a curved end portion 112, from which the barb legs are cut or stamped. A recess 114 is optionally formed between a side edge 116 of each barb leg 106 and a portion of the second attachment arm 100.

Figure 7A:
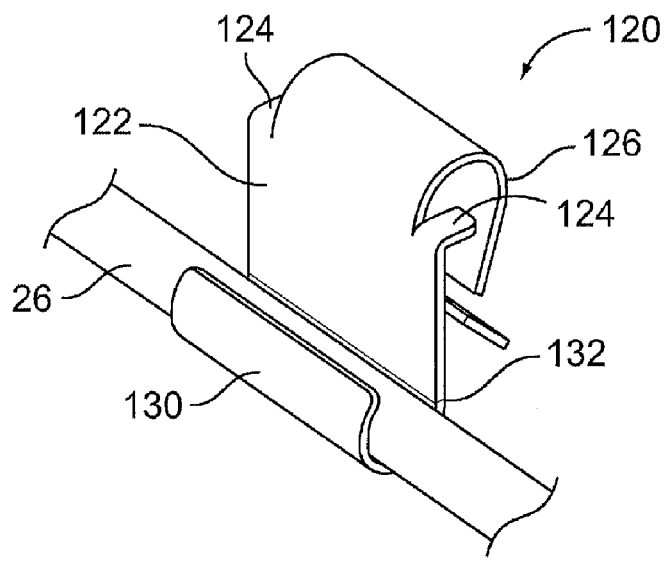
FIGS. 7A-C illustrate a clip according to yet another example embodiment.
Figure 7B:
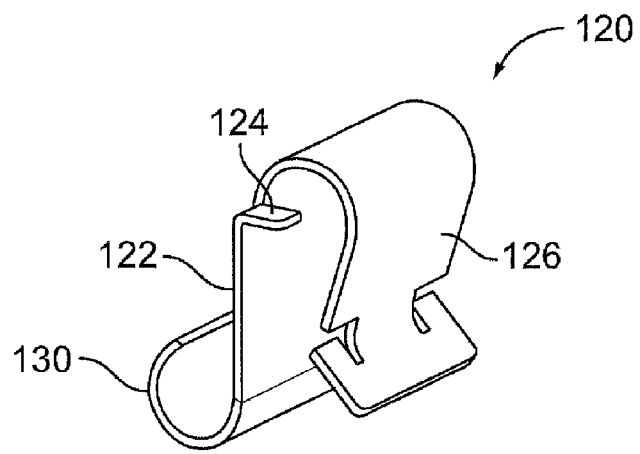
Figure 7C:
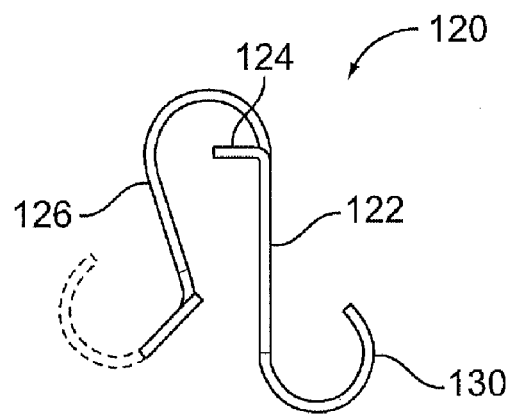

FIGS. 7A-C illustrate a clip 120 according to another example embodiment, which is a variation of the clip in FIGS. 6A-C. Clip 120 includes a strip portion 122, two first attachment arms 124 and a second attachment arm 126 as discussed above for FIGS. 6A-C. Clip 120 differs from clip 90 discussed above, by including a curved cable clamp 130 extending from an end 132 of a strip portion 122 that is opposite the first and second attachment arms 124 and 126. The cable clamp 130 is particularly useful for holding electrical connectors, such as a cable 26 of the safety switch 22 shown in FIG. 2. The clip 120 can also be used in a same or similar manner to the clip 70 discussed above, such as securing the cable 26 to a vehicle door. The clip 120 could include the optional countersunk mounting apertures, if a single, dual-purpose clip is desired.

As will be appreciated by those skilled in the art following the teachings herein provided, various and alternative sizes, shapes and configurations are available for the clips 90 and 120 as seen. For example, the cable clamp can optionally extend from the end of the second attachment arm (as illustrated in phantom in FIG. 7C) that is opposite the strip portion, thereby providing a planar surface on one side of the clip 120 for use in tight spaces.

The example clips provided are particularly useful in a method of retrofitting a vehicle door to include sensors such as the safety switch discussed herein. Each clip is selected for and applied to a particular location of the door. The first attachment arm of each clip is placed over a door flange of the vehicle door and the clip is pressed into a position where the second leg end of the barb leg is adjacent the door flange, such as shown in FIGS. 4C and 6C. The safety switch is secured to the clip, optionally by attaching the intermediate mounting bracket, either before or after the clip is attached to the vehicle.

Figure 8:
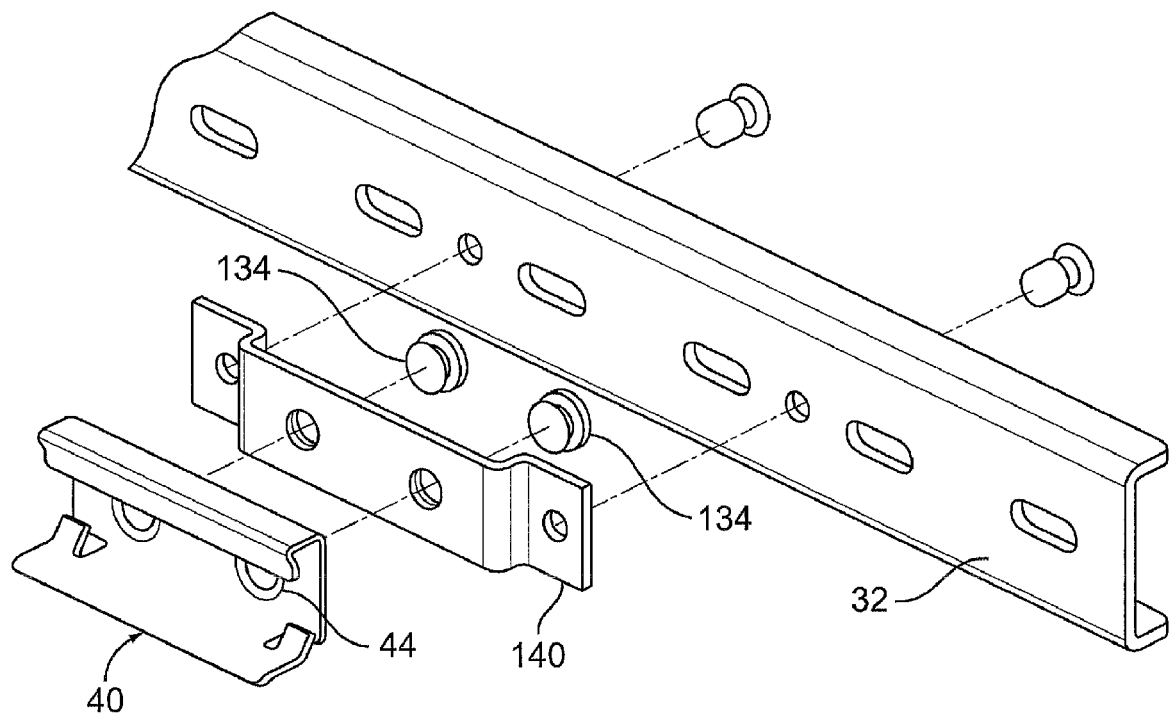
FIG. 8 illustrates a clip and mounting bracket combination according to one example embodiment.

In one embodiment, the sensor 24 of the safety switch 22 may be connected to the clip by amounting bracket, such as mounting bracket 32 discussed above. FIG. 8 illustrates an example embodiment in which a mounting bracket 32 is fastened to a clip. In FIG. 8, clip 40 is used for illustration, but it will be appreciated that any other example clip as seen herein can be used in a same or similar manner.

Fasteners 134 (e.g., rivets, screw, bolts, etc.) extend through the countersunk apertures 44 to connect the clip 40 to an optional spacer bracket 140. The spacer bracket 140 is similarly connected by fasteners (e.g., rivets, screw, bolts, etc.) to the mounting bracket 32. Attaching the mounting bracket 32 to the clip 40 before applying the clip to the door can desirably facilitate connection of the bracket 32 to the clip 40. The bracket 32, which will likely include more than one clip 40, can be easily attached by clipping the attached clips over a door flange in the manner discussed above.

FIGS. 9-11 illustrate the sensor switch applied to a vehicle door. FIGS. 9 and 10 illustrate the attachment of the clip and mounting bracket combination of FIG. 8 to an "L"-shaped flange 145 of a vehicle door 150. As discussed above, the flange is formed of a first portion 146 welded to a second portion 148. In the embodiment of the clip 40 shown, the barb legs 60 are designed to contact the bottom surface of the first portion 146 of the flange 145. As mentioned above, by having the barb legs 60 contact the first portion 146, the clip 40 is assured a secured fit even when the flange components 146 and 148 are slightly misaligned. In FIGS. 9 and 10, a sensor 24 is shown mounted in the mounting bracket 32.

FIG. 11 illustrates the clip 90 attached to an "I"-shaped flange 165 of a door 160. The clip 90 is attached to a spacer bracket 162, which allows for attachment of the mounting bracket 32 at a ninety-degree angle to the flange 165. In this embodiment, one type of mounting bracket can be used for both "I"-shaped and "L"-shaped flanges. As will be appreciated by those skilled in the art following the teachings herein provided, the mounting bracket 32 can be designed to attach directly to the clip or the mounting bracket can otherwise be configured to make the use of the spacer bracket 162 unnecessary.

Thus a clip and a mountable safety sensor strip are provided for retrofitting, for example, an up-armored military vehicle having a motorized door assist system. The clips, as seen, are easily mounted to portions of the door or vehicle frame during sensor installation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A clip comprising:
   a strip portion;
   a first attachment arm extending from the strip portion, wherein the strip portion is planar and the first attachment arm extends at a first end of the strip portion substantially perpendicular to the strip portion;
   a second attachment arm extending from the strip portion, wherein the second attachment arm comprises a curved portion extending from the first end of the strip portion; and
   a barb leg disposed at an angle relative to the strip portion and including a first leg end and a second leg end, the barb leg connected at the first leg end to the second attachment arm and the second leg end is disposed toward and spaced apart from the strip portion.

2. The clip according to claim 1, wherein the first attachment arm comprises two first attachment arms, and the curved portion of the second attachment arm is disposed between the two first attachment arms.

3. The clip according to claim 1, wherein the barb leg is disposed at an end of the second attachment arm opposite the strip portion.

4. A clip comprising:
   a planar strip portion including a first end and a second end opposite the first end;
   a countersunk mounting aperture disposed through the strip portion for receiving a fastener therethrough;
   two first attachment arms extending substantially perpendicular from a first end of the strip portion;
   a second attachment arm extending from the strip portion, the second attachment arm including a curved portion extending from the first end of the strip portion, the curved portion of the second attachment arm disposed between the two first attachment arms; and
   a barb leg disposed at an angle relative to the strip portion, the barb leg including a first leg end and a second leg end, the barb leg connected at the first leg end to the second attachment arm and the second leg end is disposed toward and spaced apart from an area toward the second end of the strip portion.

5. The clip according to claim 4, wherein the barb leg is disposed at an end of the second attachment arm opposite the strip portion.

6. The clip according to claim 4, further comprising a plurality of barb legs disposed at an angle relative to the strip portion.

* * * * *